United States Patent
Byun et al.

(10) Patent No.: US 8,254,784 B2
(45) Date of Patent: Aug. 28, 2012

(54) LIGHT SOURCE DISTRIBUTOR FOR USE IN WAVELENGTH DIVISION MULTIPLEXED-PASSIVE OPTICAL NETWORK

(75) Inventors: Jae Oh Byun, Chungcheongnam-do (KR); Ji Min Seo, Seoul (KR)

(73) Assignee: Luxpert Technologies Co., Ltd. (KR)

( * ) Notice: Subject to any disclaimer, the term of this patent is extended or adjusted under 35 U.S.C. 154(b) by 278 days.

(21) Appl. No.: 12/516,932

(22) PCT Filed: Nov. 16, 2007

(86) PCT No.: PCT/KR2007/005783
§ 371 (c)(1),
(2), (4) Date: Jan. 5, 2010

(87) PCT Pub. No.: WO2009/001993
PCT Pub. Date: Dec. 31, 2008

(65) Prior Publication Data
US 2010/0119232 A1    May 13, 2010

(30) Foreign Application Priority Data

Jun. 25, 2007  (KR) .................. 10-2007-0062027

(51) Int. Cl.
*H04J 14/02* (2006.01)

(52) U.S. Cl. ............................ 398/82; 398/83; 398/85
(58) Field of Classification Search .............. 398/58, 398/66–72, 82–88
See application file for complete search history.

(56) References Cited

U.S. PATENT DOCUMENTS

| | | | |
|---|---|---|---|
| 2005/0041971 A1* | 2/2005 | Lee et al. | 398/72 |
| 2006/0045525 A1* | 3/2006 | Lee et al. | 398/71 |
| 2006/0115270 A1* | 6/2006 | Kim et al. | 398/71 |
| 2006/0177223 A1* | 8/2006 | Hwang et al. | 398/71 |

* cited by examiner

*Primary Examiner* — Dzung Tran
(74) *Attorney, Agent, or Firm* — Cantor Colburn LLP

(57) ABSTRACT

The present disclosure is directed to a light source distributor for use in an injection-locked WDM-PON (wavelength division multiplexed-passive optical network). The light source distributor receives an A band and a B band injection optical signals through a single optical terminal from an injection light source for outputting both the A band and the B band injection optical signals; transmits the A band injection optical signal to a first optical multiplexer/demultiplexer of a central office and the B band injection signal to a second optical multiplexer/demultiplexer of a remote node; transmits a wavelength-locked A band optical signal received from the first optical multiplexer/demultiplexer to the second optical multiplexer/demultiplexer; and transmits a wavelength-locked B band optical signal received from the second optical multiplexer/demultiplexer to the first optical multiplexer/demultiplexer.

12 Claims, 3 Drawing Sheets

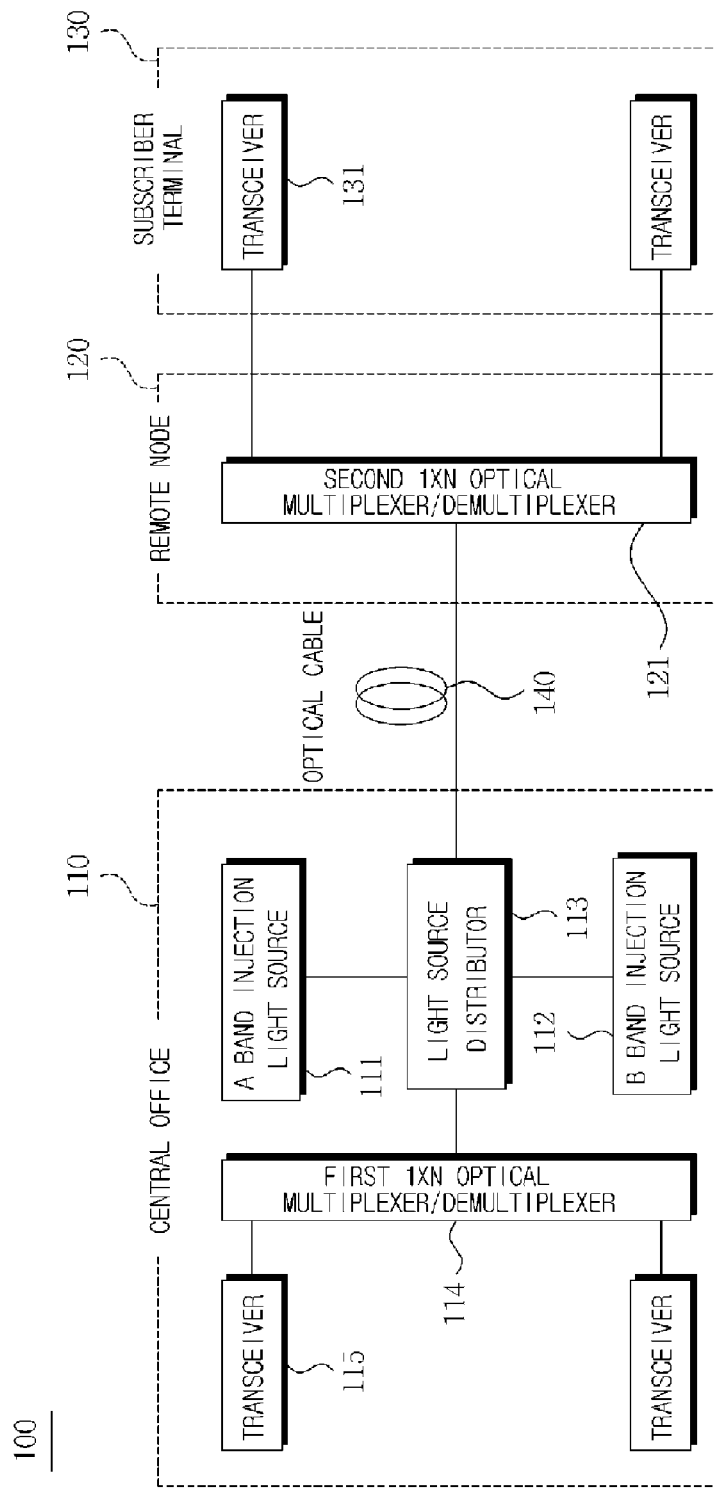
[Fig. 1]

[Fig. 2]
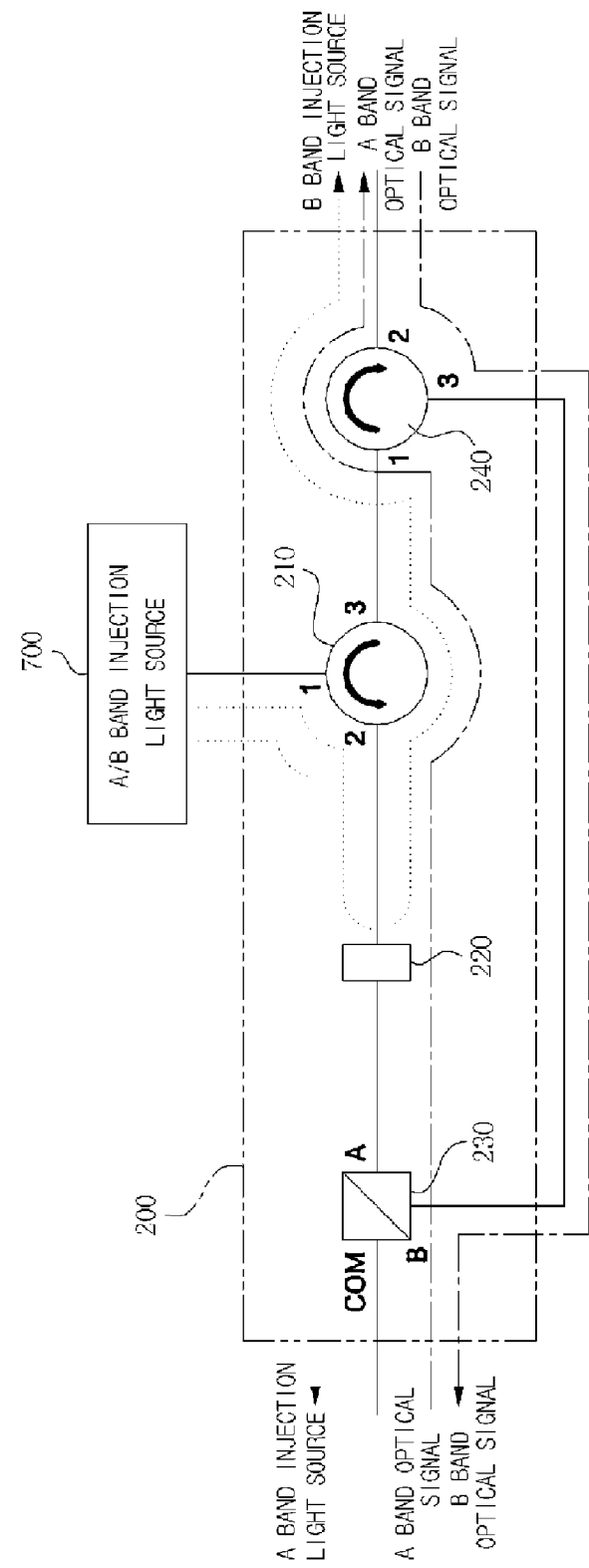

[Fig. 3]
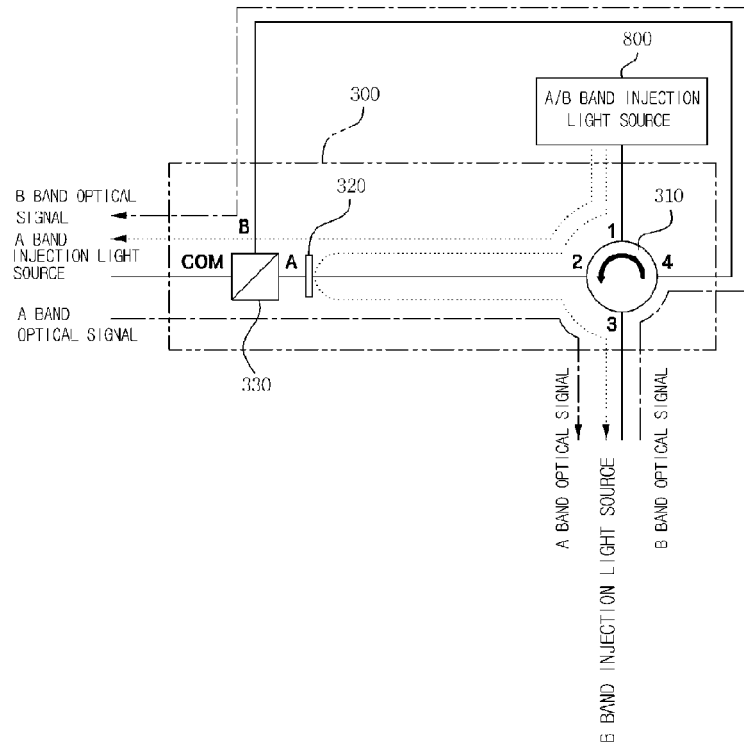
[Fig. 4]
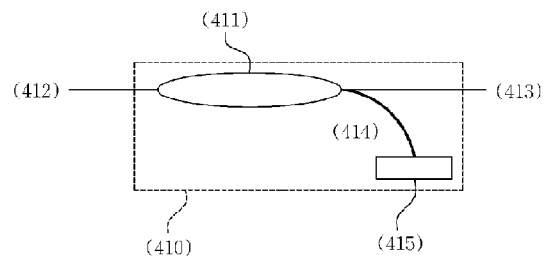
[Fig. 5]
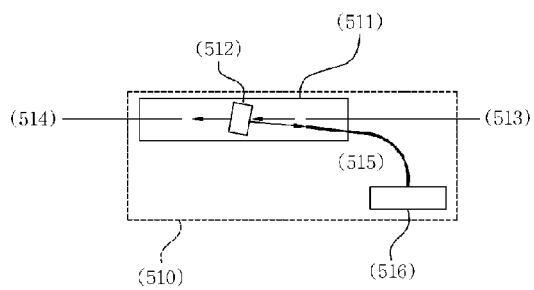
[Fig. 6]
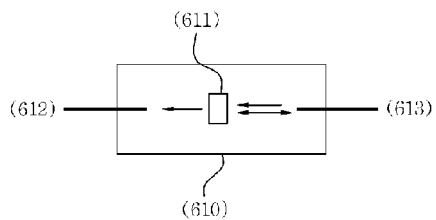

LIGHT SOURCE DISTRIBUTOR FOR USE IN WAVELENGTH DIVISION MULTIPLEXED-PASSIVE OPTICAL NETWORK

TECHNICAL FIELD

The present disclosure relates to a light source distributor; and, more particularly, to a light source distributor for use in an injection-locked WDM-PON (wavelength division multiplexed-passive optical network).

BACKGROUND ART

A wavelength division multiplexed-passive optical network (WDM-PON) provides a high speed broadband communication service by using an inherent wavelength assigned to each subscriber. Accordingly, each subscriber receives a signal having a different wavelength corresponding thereto, so that a security is enhanced and a separate communication service is provided to each subscriber, thereby enlarging a communication capacity.

Conventionally, a method has been proposed wherein a central office and a subscriber terminal have a respective light source including a distributed feedback-laser diode (DFB-LD) element, thereby realizing the WDM-PON.

However, such method has problems that the DFB-LD element is expensive and a temperature control technique is complicated.

Accordingly, a technique using a wavelength-locked optical signal has been widely used by injecting an incoherent light source into a Fabry-Perot Laser Diode (FP-LD) of a low price, thereby implementing a WDM optical signal. Further, in order to obtain much broader transmission bandwidth, a wavelength-fixed optical signal has been also used as the WDM optical signal, wherein the wavelength-fixed optical signal can be provided by applying an injection light source to a reflective semiconductor optical amplifier (RSOA) and modulating a current of the RSOA.

Hereinafter, a configuration of a conventional wavelength division multiplexed-passive optical network 100 will be described in reference to FIG. 1. FIG. 1 shows a schematic block diagram for showing a conventional bidirectional communication in an injection-locked wavelength division multiplexed-passive optical network.

The injection-locked wavelength division multiplexed-passive optical network 100 includes a central office 110, a subscriber terminal 130, a remote note 120 for connecting the central office 110 with each subscriber terminal 130 and an optical cable 140.

The central office 110 has an A band injection light source 111, a B band injection light source 112, a light source distributor 113, a first 1×N optical multiplexer/demultiplexer 114 and a multiplicity of transceivers 115.

The remote node 120 has a second 1×N optical multiplexer/demultiplexer 121 and the subscriber terminal 130 has a plurality of transceivers 131.

The A band injection light source 111 is provided as a light source for an A band optical signal serving as a downstream optical signal. As the A band injection light source 111, an incoherent light source may be mainly used. The A band injection light source 111 generates the A band injection optical signal, and then transmits it to the light source distributor 113.

The B band injection light source 112 is provided as a light source for B band optical signal serving as an upstream optical signal, and, like the A band injection light source 111, an incoherent light source may be mainly used as the B band injection light source 112. The B band injection light source 112 generates the B band injection optical signal, and then transmits it to the light source distributor 113.

The light source distributor 113 receives the A band injection optical signal from the A band injection light source 111 and transmits it to the first 1×N optical multiplexer/demultiplexer 114 of the central office 110. Further, the light source distributor 113 receives a wavelength-locked A band optical signal from the first 1×N optical multiplexer/demultiplexer 114 of the central office 110 and transmits it to the optical cable 140 connected to the remote node 120.

In addition, the light source distributor 113 receives the B band injection optical signal from the B band injection light source 112 and transmits it to the second 1×N optical multiplexer/demultiplexer 121 of the remote node 120 through the optical cable 140. Further, the light source distributor 113 receives a wavelength-locked B band optical signal from the second 1×N optical multiplexer/demultiplexer 121 of the remote node 120 and transmits it to the first 1×N optical multiplexer/demultiplexer 114 of the central office 110.

The first 1×N optical multiplexer/demultiplexer 114 separates the A band optical signal received from the light source distributor 113 according to the wavelength thereof, and then, injects it to each transmitter of the transceivers 115 of the central office 110. For example, as the first 1×N optical multiplexer/demultiplexer 114, an arrayed waveguide grating (AWG) may be used.

As the transmitter of the transceivers 115, the Fabry-Perot Laser Diode (FP-LD) may be used and the transmitter generates the downstream optical signal to be transmitted to each subscriber.

Specifically, if the A band injection optical signal separated based on the wavelength thereof is injected to each transmitter of the transceivers 115, wavelength elements having a wavelength different from that of the injected optical signal are suppressed and wavelength elements having a wavelength equal to that of the injected optical signal is locked, thereby outputting the wavelength-locked A band downstream optical signal.

Each receiver of the transceivers 115 receives a wavelength-locked B band upstream optical signal from the subscriber terminal 130, and then, converts it into an electrical signal. A photo diode (PD) may be used as the receiver of the transceivers 115.

The second 1×N optical multiplexer/demultiplexer 121 of the remote node 120 separates the B band optical signal received from the light source distributor 113 based on the wavelength thereof, and then, injects it to the transceivers 131 of the subscriber terminal 130. The arrayed waveguide grating (AWG) may be used as the second 1×N optical multiplexer/demultiplexer 121 like the first 1×N optical multiplexer/demultiplexer 114.

The Fabry-Perot Laser Diode (FP-LD) may be used as the transmitter of the transceivers 131, for example, and the transmitter generates an upstream optical signal to be transmitted to the central office 110.

Specifically, if the B band injection optical signal separated according to the wavelength thereof is injected to the transmitter of the transceivers 131, wavelength elements having a wavelength different from that of the injected optical signal are suppressed and wavelength elements having a wavelength equal to that of the injected optical signal is locked, thereby outputting the wavelength-locked B band upstream optical signal.

Each receiver of the transceivers 131 receives the wavelength-locked A band downstream optical signal from the central office 110, and then, converts it into an electrical signal. A photo diode (PD) may be used as the receiver of the transceivers 131.

Accordingly, as described above, the development of the light source distributor is strongly required, the light source capable of receiving the A band injection light source 111 as an input and outputting it to a common terminal of the first 1×N optical multiplexer/demultiplexer 114 of the central office 110 with a minimum optical loss; receiving the B band injection light source 112 as an input and outputting it to the optical cable 140 toward the remote node 120 with a minimum optical loss; transmitting the downstream optical signal outputted from the transmitter of the transceivers 115 of the central office 110 to the optical cable 140 with a minimum optical loss and transmitting the upstream optical signal outputted from the transceivers 131 of the subscriber terminal 130 to the common terminal of the first 1×N optical multiplexer/demultiplexer 114 of the central office 110 with a minimum optical loss.

DISCLOSURE OF INVENTION

Technical Problem

The present disclosure is related to a light source distributor for use in an injection-locked WDM-PON (wavelength division multiplexed-passive optical network).

Technical Solution

The light source distributor receives an A band and a B band injection optical signals through a single optical terminal from an injection light source for outputting both the A band and the B band injection optical signals; transmits the A band injection optical signal to a first optical multiplexer/demultiplexer of a central office and the B band injection signal to a second optical multiplexer/demultiplexer of a remote node; transmits a wavelength-locked A band optical signal received from the first optical multiplexer/demultiplexer to the second optical multiplexer/demultiplexer; and transmits a wavelength-locked B band optical signal received from the second optical multiplexer/demultiplexer to the first optical multiplexer/demultiplexer.

BRIEF DESCRIPTION OF THE DRAWINGS

The disclosure may best be understood by reference to the following description taken in conjunction with the following figures:

FIG. 1 shows a schematic block diagram for showing a conventional bidirectional communication in an injection-locked wavelength division multiplexed-passive optical network;

FIG. 2 sets forth a schematic diagram of a light source distributor for use in an injection-locked wavelength division multiplexed-passive optical network in accordance with a first embodiment of the present invention;

FIG. 3 presents a schematic diagram of a light source distributor for use in an injection-locked wavelength division multiplexed-passive optical network in accordance with a second embodiment of the present invention;

FIG. 4 illustrates a schematic diagram of an A-band pass/B-band reflection filter using a fused fiber WDM coupler in accordance with one embodiment of the present invention;

FIG. 5 offers a schematic diagram of an A-band pass/B-band reflection filter using a three-terminal thin film filter in accordance with one embodiment of the present invention; and FIG. 6 depicts a schematic diagram of an A-band pass/B-band reflection filter using two-terminal thin film filter in accordance with one embodiment of the present invention.

MODE FOR THE INVENTION

In the following description, numerous specific details are set forth. It will be apparent, however, that these embodiments may be practiced without some or all of these specific details. In other instances, well known process steps or elements have not been described in detail in order not to unnecessarily obscure the disclosure.

Hereinafter, a light source distributor in accordance with a first embodiment of the present invention will be described with reference to FIG. 2. FIG. 2 sets forth a schematic diagram of a light source distributor 200 for use in an injection-locked wavelength division multiplexed-passive optical network in accordance with the first embodiment of the present invention.

The light source distributor 200 includes a first optical circulator 210; an A-band pass/B-band reflection filter 220; an A/B band wavelength mux/demux filter 230 and a second optical circulator 240.

An injection light source 700 generates both an A band optical signal serving as a downstream optical injection signal and a B band optical signal serving as an upstream optical injection signal. Although an incoherent light source is mainly used as the injection light source 700, it is possible to employ a coherent light source if necessary. The injection light source 700 outputs an A band and B band optical signals to a first terminal of the first optical circulator 210 of the light source distributor 200.

The first terminal of the first optical circulator 210 is connected to the injection light source 700; a second terminal thereof is connected to the A-band pass/B-band reflection filter 220; and a third terminal thereof is connected to a first terminal of the second optical circulator 240.

After the first optical circulator 210 receives the A band optical signal and the B band optical signal from the injection light source 700 through the first terminal thereof, it transmits the signals to the A-band pass/B-band reflection filter 220 connected to the second terminal thereof. Further, after the first optical circulator 210 receives the B band optical signal reflected from the A-band pass/B-band reflection filter 220 through the second terminal thereof, it output the signal to the third terminal thereof, thereby transmitting it to the first terminal of the second optical circulator 240.

Moreover, the first optical circulator 210 receives a wavelength-locked A band downstream optical signal from the A-band pass/B-band reflection filter 220 through the second terminal thereof, and then it outputs the signal to the third terminal thereof, to thereby transmit it to the first terminal of the second optical circulator 240.

The A-band pass/B-band reflection filter 220 passes the A band optical signal and reflects the B band optical signal. Accordingly, if the A-band pass/B-band reflection filter 220 receives the A band and the B band optical signals from the second terminal of the first optical circulator 210, it passes the A band optical signal to transmit it to an A band terminal of the A/B band wavelength mux/demux filter 230 while reflecting the B band optical signal to transmit it to the second terminal of the first optical circulator 210.

Further, the A-band pass/B-band reflection filter 220 passes the wavelength-locked A band downstream optical signal from the A/B band wavelength mux/demux filter 230 to the second terminal of the first optical circulator 210.

The A/B band wavelength mux/demux filter 230 includes an A band terminal, a B band terminal and a common band terminal. The A band terminal is connected to the A-band pass/B-band reflection filter 220; the B band terminal is connected to a third terminal of the second optical circulator 240; and the common band terminal is connected to a first 1×N optical multiplexer/demultiplexer (not shown) of a central office.

The A/B band wavelength mux/demux filter 230 outputs the optical signal received from the A band terminal or the B band terminal to the common band terminal. Further, the A/B band wavelength mux/demux filter 230 outputs the A band optical signal received from the common band terminal to the A band terminal; and outputs the B band optical signal received from the common band terminal to the B band terminal.

Accordingly, after the A/B band wavelength mux/demux filter 230 receives the A band optical signal through the A band terminal thereof from the A-band pass/B-band reflection filter 220, it outputs the signal to the common band terminal connected to the first 1×N optical multiplexer/demultiplexer.

Further, the A/B band wavelength mux/demux filter 230 receives the wavelength-locked A band downstream optical signal through the common band terminal from the first 1×N optical multiplexer/demultiplexer and then it outputs the signal to the A band terminal connected to the A-band pass/B-band reflection filter 220.

Furthermore, the A/B band wavelength mux/demux filter 230 receives the wavelength-locked B band upstream optical signal through the B band terminal from the third terminal of the second optical circulator 240, and then it outputs the signal to the common band terminal connected to the first 1×N optical multiplexer/demultiplexer.

The first terminal of the second optical circulator 240 is connected to the third terminal of the first optical circulator 210; a second terminal thereof is connected to the optical cable toward a remote node (not shown); and a third terminal thereof is connected to the B band terminal of the A/B band wavelength mux/demux filter 230.

The second optical circulator 240 receives the B band injection optical signal outputted from the third terminal of the first optical circulator 210 through the first terminal thereof, and then it outputs the signal to the second terminal thereof to transmit it to the remote node.

Further, the second optical circulator 240 receives the wavelength-locked A band downstream optical signal outputted from the third terminal of the first optical circulator 210 through the first terminal thereof, and then it outputs the signal to the second terminal thereof to transmit it to the remote node.

Moreover, the second optical circulator 240 receives the wavelength-locked B band upstream optical signal outputted from the remote node through the second terminal thereof, and then it outputs the signal to the third terminal thereof to transmit it to the B band terminal of the A/B band wavelength mux/demux filter 230.

Therefore, the light source distributor 200 in accordance with the first embodiment of the present invention can realize the injection-locked wavelength division multiplexed-passive optical network (WDM-PON) with a minimum optical loss by using the injection light source 700 for generating both A band and B band injection optical signals; two three-terminal optical circulators 210 and 240; the A-band pass/B-band reflection filter 220; and the A/B band wavelength mux/demux filter 230. All of the optical components are commercially available.

In other words, the light source distributor 200 in accordance with the first embodiment of the present invention outputs the A band injection optical signal generated by the injection light source 700 to the common band terminal of the first 1×N optical multiplexer/demultiplexer of the central office with a minimum optical loss; outputs the B band injection optical signal generated by the injection light source 700 to the optical cable toward the remote node with a minimum optical loss; transmits the downstream optical signal outputted from the transmitter of the central office to the optical cable with a minimum optical loss; and transmits the upstream optical signal outputted from the transmitter of the subscriber terminal to the common terminal of the first 1×N optical multiplexer/demultiplexer of the central office with a minimum optical loss.

Hereinafter, a light source distributor in accordance with a second embodiment of the present invention will be described in reference to FIG. 3. FIG. 3 presents a schematic diagram of a light source distributor 300 for use in an injection-locked wavelength division multiplexed-passive optical network in accordance with the second embodiment of the present invention.

The light source distributor 300 includes a four-terminal optical circulator 310, an A-band pass/B-band reflection filter 320 and an A/B band wavelength mux/demux filter 330.

An injection light source 800 generates both an A band optical signal serving as a downstream optical signal and a B band optical signal serving as an upstream optical signal. Although the incoherent light source is mainly used as the injection light source 800, the coherent light source may also be used if necessary. The injection light source 800 outputs the A band and the B band injection optical signals to a first terminal of the four-terminal optical circulator 310 of the light source distributor 300.

The first terminal of the four-terminal optical circulator is connected to the injection light source 800; a second terminal thereof is connected to the A-band pass/B-band reflection filter 320; and a third terminal thereof is connected to a remote node (not shown); and a fourth terminal thereof is connected to a B band terminal of the A/B band wavelength mux/demux filter 330.

The four-terminal optical circulator 310 receives the A band injection optical signal and the B band injection optical signals through the first terminal from the injection light source 800, and then it outputs the signals to the second terminal to transmit them to the A-band pass/B-band reflection filter 320.

Further, the four-terminal optical circulator 310 receives the B band injection optical signal reflected from the A-band pass/B-band reflection filter 320 or the wavelength-locked A band downstream optical signal passed from the A-band pass/B-band reflection filter 320 through the second terminal, and then it outputs them to the third terminal to transmit them to the remote node.

Furthermore, the four-terminal optical circulator 310 receives the wavelength-locked B band upstream optical signal from the remote node through the third terminal, and then it outputs it to the fourth terminal to transmit it to a B band terminal of the A/B band wavelength mux/demux filter 330.

The A-band pass/B-band reflection filter 320 passes the A band optical signal and reflects the B band optical signal. Accordingly, if the A-band pass/B-band reflection filter 320 receives the A band and the B band injection optical signals from the second terminal of the four-terminal optical circulator 310, the A-band pass/B-band reflection filter 320 passes the A band optical signal to transmit it to an A band terminal of the A/B band wavelength mux/demux filter 330; and reflects the B band optical signal to transmit it to the second terminal of the four-terminal optical circulator 310.

The A/B band wavelength mux/demux filter 330 includes an A band terminal, a B band terminal and a common band terminal. The A band terminal is connected to the A-band pass/B-band reflection filter 320; the B band terminal is connected to the fourth terminal of the four-terminal optical circulator 310; and the common band terminal is connected to the first 1×N optical multiplexer/demultiplexer (not shown) of the central office.

The A/B band wavelength mux/demux filter 330 outputs the optical signal, inputted to the A band or the B band terminal, to the common band terminal; outputs the A band optical signal, inputted to the common band terminal, to the A band terminal; and outputs the B band optical signal, inputted to the common band terminal, to the B band terminal.

Accordingly, if the A/B band wavelength mux/demux filter 330 receives the A band injection optical signal transmitted from the A-band pass/B-band reflection filter 320 through the A band terminal, it outputs the signal to the common band terminal to transmit it to the first 1×N optical multiplexer/demultiplexer.

Moreover, the A/B band wavelength mux/demux filter 330 receives the wavelength-locked A band optical signal transmitted from the first 1×N optical multiplexer/demultiplexer through the common band terminal, and then it outputs the signal to the A band terminal to thereby transmit it to the A-band pass/B-band reflection filter 320.

Furthermore, if the A/B band wavelength mux/demux filter 330 receives the wavelength-locked B band optical signal transmitted from the fourth terminal of the four-terminal optical circulator 310 through the B band terminal thereof, it outputs the signal to the common band terminal thereof, thereby transmitting it to the first 1×N optical multiplexer/demultiplexer.

Therefore, the light source distributor 300 in accordance with the second embodiment of the present invention can realize the injection-locked wavelength division multiplexed-passive optical network (WDM-PON) with a minimum optical loss by using a single injection light source 800 capable of generating both of A band and B band injection optical signals; a single four-terminal optical circulator 310; an A-band pass/B-band reflection filter 320; and an A/B band wavelength mux/demux filter 330.

In other words, the light source distributor 300 in accordance with the second embodiment of the present invention outputs the A band injection optical signal generated by the injection light source 800 to the common band terminal of the first 1×N optical multiplexer/demultiplexer of the central office with a minimum optical loss; outputs the B band injection optical signal generated by the injection light source 800 to the optical cable toward the remote node with a minimum optical loss; transmits the downstream optical signal outputted by the transmitter of the central office to the optical cable with a minimum optical loss; and transmits the upstream optical signal outputted by the transmitter of the subscriber terminal to the common terminal of the first 1×N optical multiplexer/demultiplexer of the central office with a minimum optical loss.

Hereinafter, configuration and operation of an A-band pass/B-band reflection filter in accordance with one embodiment of the present invention will be described in reference to FIG. 4. FIG. 4 illustrates a schematic diagram of an A-band pass/B-band reflection filter 410 using a fused optical fiber WDM coupler 411 in accordance with the embodiment of the present invention.

If the A band and the B band are far from each other (e.g., generally greater than several tens of nm), the fused optical fiber WDM coupler 411, which can be obtained at a low price, can couple and decouple two bands. Typically, such a coupler includes three optical ports, i.e., a common band terminal 412, an A band terminal 413 and a B band terminal 414 as shown in FIG. 4.

In order to implement the A-band pass/B-band reflection filter 410 having two ports by using such a coupler in accordance with the embodiment of the present invention, a reflecting mirror 415 may be installed at one end of the B band terminal 414. At this time, the reflecting mirror 415 can be formed just by performing a reflection coating process on the end of the optical fiber of the B band terminal 414. Moreover, it can also be made by using a commercial reflecting mirror.

Specifically, the A band optical signal passes along the following two paths.
1. the common(A/B) band terminal→the A band terminal
2. the A band terminal→the common(A/B) band terminal Further, the B band optical signal is reflected has along the following one path: the common(A/B) band terminal→the B band terminal→the reflecting mirror→the B band terminal→the common(A/B) band terminal.

Hereinafter, configuration and operation of an A-band pass/B-band reflection filter using a three-terminal thin film filter in accordance with one embodiment of the present invention will be described in reference to FIG. 5. FIG. 5 offers a schematic diagram of the A-band pass/B-band reflection filter 510 using the three-terminal thin film filter.

If the A band and the B band are close to each other (e.g., generally within several nm), a thin film filter 512 may be employed to couple and decouple two bands. In general, a three-terminal thin film filter 511 having three optical ports, i.e., a common band terminal 513, an A band terminal 514 and a B band terminal 515 is configured to have a predetermined angle with respect to a path of the optical signal as shown in FIG. 5.

In order to implement the A-band pass/B-band reflection filter 510 having two ports by using such a filter, a reflecting mirror 516 is placed at one end of the B band terminal 515 as shown in FIG. 5. At this time, the reflecting mirror 516 can be formed just by performing the reflection coating process on the end of the optical fiber of the B band terminal 515 or by performing the reflection coating process on the end of the optical ferrule. Further, it can also be made by using a commercial reflecting mirror element.

Specifically, the A band optical signal passes along the following two paths.
1. the common(A/B) band terminal→the A band terminal
2. the A band terminal→the common(A/B) band terminal Further, the B band optical signal is reflected along the following one path: the common(A/B) band terminal→the B band terminal→the reflecting mirror→the B band terminal→the common(A/B) band terminal.

Hereinafter, configuration and operation of an A-band pass/B-band reflection filter using a two-terminal thin film filter in accordance with one embodiment of the present invention will be described in reference to FIG. 6. FIG. 6 depicts a schematic diagram of the A-band pass/B-band reflection filter 610 using the two-terminal thin film filter.

If a thin film filter 611 is arranged to have an angle substantially perpendicular to a path of the optical signal, the A-band pass/B-band reflection filter 610 is configured to have two terminals so that an additional reflecting mirror is not necessary. Also, it is easy to manufacture the A-band pass/B-band reflection filter 610 by using the two-terminal filter in lieu of the three-terminal filter.

Specifically, the A band optical signal passes along the following two paths.
1. a first terminal→the thin film filter→a second terminal
2. the second terminal→the thin film filter→the first terminal Meanwhile, the B band optical signal is reflected along the following two paths.
1. the first terminal→the thin film filter→the first terminal
2. the second terminal→the thin film filter→the second terminal.

While the invention has been shown and described with respect to the embodiments of the present invention, it will be understood by those skilled in the art that various changes and modifications may be made without departing from the spirit and scope of the invention as defined in the following claims.

INDUSTRIAL APPLICABILITY

Therefore, in accordance with the embodiments of the present invention, there is provided the light source distributor for use in the wavelength division multiplexed-passive optical network, the light source distributor capable of providing the optical signal having a respective wavelength to each subscriber by using a single injection light source.

Further, the light source distributor in accordance with the embodiments of the present invention receives the A band injection optical signal to thereby output it to the optical multiplexer/demultiplexer of the central office; receives the B band injection optical signal to thereby output it to the optical cable toward the remote node; transmits the downstream optical signal outputted from the transmitter of the central office to the optical cable; and transmits the upstream optical signal outputted by the transmitter of the subscriber terminal to the optical multiplexer/demultiplexer of the central office with a minimum optical loss.

Furthermore, if the A band and the B band are close to each other like C/L band, it is possible to manufacture the light source distributor by using a single injection light source of a low price and a small size. Accordingly, there is provided a network system optimized to the injection light source capable of outputting both the A band and the B band.

The invention claimed is:

1. A light source distributor for use in a wavelength division multiplexed-passive optical network,
wherein the light source distributor receives an A band and a B band injection optical signals through a single optical terminal from an injection light source for outputting both the A band and the B band injection optical signals;
transmits the A band injection optical signal to a first optical multiplexer/demultiplexer of a central office and the B band injection signal to a second optical multiplexer/demultiplexer of a remote node;
transmits a wavelength-locked A band optical signal received from the first optical multiplexer/demultiplexer to the second optical multiplexer/demultiplexer; and
transmits a wavelength-locked B band optical signal received from the second optical multiplexer/demultiplexer to the first optical multiplexer/demultiplexer,
wherein the light source distributor includes:
an A-band pass/B-band reflection filter for receiving the A band and the B band injection optical signals from the injection light source, passing the A band injection optical signal toward the first optical multiplexer/demultiplexer and reflecting the B band injection optical signal toward the second optical multiplexer/demultiplexer; and
an A/B band wavelength mux/demux filter having an A band terminal, a B band terminal and a common band terminal,
wherein the A/B band wavelength mux/demux filter outputs the optical signal inputted from the A band terminal or the B band terminal to the common band terminal; outputs the A band optical signal inputted from the common band terminal to the A band terminal; and outputs the B band optical signal inputted from the common band terminal to the B band terminal, and
wherein the A band terminal is connected to the A-band pass/B-band reflection filter; the B band terminal is connected to the second optical multiplexer/demultiplexer; and the common band terminal is connected to the first optical multiplexer/demultiplexer.

2. The light source distributor of claim 1, wherein the A-band pass/B-band reflection filter has a fused fiber WDM coupler.

3. The light source distributor of claim 1, wherein the A-band pass/B-band reflection filter has a three-terminal thin film filter configured to have a predetermined angle with respect to a path of the optical signal.

4. The light source distributor of claim 1, wherein the A-band pass/B-band reflection filter has a two-terminal thin film filter configured to have an angle substantially perpendicular to a path of the optical signal.

5. A light source distributor for use in a wavelength division multiplexed-passive optical network,
wherein the light source distributor receives an A band and a B band injection optical signals through a single optical terminal from an injection light source for outputting both the A band and the B band injection optical signals;
transmits the A band injection optical signal to a first optical multiplexer/demultiplexer of a central office and the B band injection signal to a second optical multiplexer/demultiplexer of a remote node;
transmits a wavelength-locked A band optical signal received from the first optical multiplexer/demultiplexer to the second optical multiplexer/demultiplexer; and
transmits a wavelength-locked B band optical signal received from the second optical multiplexer/demultiplexer to the first optical multiplexer/demultiplexer,
wherein the light source distributor includes:
an A-band pass/B-band reflection filter for receiving the A band and the B band injection optical signals from the injection light source, passing the A band injection optical signal toward the first optical multiplexer/demultiplexer and reflecting the B band injection optical signal toward the second optical multiplexer/demultiplexer; and
a first optical circulator and a second optical circulator, each circulator having a first terminal, a second terminal and a third terminal,
wherein the first and the second optical circulators output the optical signal inputted from the first terminal to the second terminal, and output the optical signal inputted from the second terminal to the third terminal, respectively, and
wherein the first terminal of the first optical circulator is connected to the injection light source; the second terminal of the first optical circulator is connected to the A-band pass/B-band reflection filter; the third terminal of the first optical circulator is connected to the first terminal of the second optical circulator; the second terminal of the second optical circulator is connected to the second optical multiplexer/demultiplexer; and the third terminal of the second optical circulator is connected to the B band terminal of the A/B band wavelength mux/demux filter.

6. The light source distributor of claim 5, wherein the A-band pass/B-band reflection filter has a fused fiber WDM coupler.

7. The light source distributor of claim 5, wherein the A-band pass/B-band reflection filter has a three-terminal thin film filter configured to have a predetermined angle with respect to a path of the optical signal.

8. The light source distributor of claim 5, wherein the A-band pass/B-band reflection filter has a two-terminal thin film filter configured to have an angle substantially perpendicular to a path of the optical signal.

9. A light source distributor for use in a wavelength division multiplexed-passive optical network,
   wherein the light source distributor receives an A band and a B band injection optical signals through a single optical terminal from an injection light source for outputting both the A band and the B band injection optical signals;
   transmits the A band injection optical signal to a first optical multiplexer/demultiplexer of a central office and the B band injection signal to a second optical multiplexer/demultiplexer of a remote node;
   transmits a wavelength-locked A band optical signal received from the first optical multiplexer/demultiplexer to the second optical multiplexer/demultiplexer; and
   transmits a wavelength-locked B band optical signal received from the second optical multiplexer/demultiplexer to the first optical multiplexer/demultiplexer, and
   wherein the light source distributor includes:
   an A-band pass/B-band reflection filter for receiving the A band and the B band injection optical signals from the injection light source, passing the A band injection optical signal toward the first optical multiplexer/demultiplexer and reflecting the B band injection optical signal toward the second optical multiplexer/demultiplexer;
   an A/B band wavelength mux/demux filter having an A band terminal, a B band terminal and a common band terminal,
   wherein the A/B band wavelength mux/demux filter outputs the optical signal inputted from the A band terminal or the B band terminal to the common band terminal; outputs the A band optical signal inputted from the common band terminal to the A band terminal; and outputs the B band optical signal inputted from the common band terminal to the B band terminal; and
   a four-terminal optical circulator having a first terminal, a second terminal, a third terminal and a fourth terminal, wherein the four-terminal optical circulator outputs the optical signal inputted from the first terminal to the second terminal; outputs the optical signal inputted from the second terminal to the third terminal; and outputs the optical signal inputted from the third terminal to the fourth terminal,
   wherein the first terminal is connected to the injection light source; the second terminal is connected to the A-band pass/B-band reflection filter; the third terminal is connected to the second optical multiplexer/demultiplexer; and the fourth terminal is connected to the B band terminal of the A/B band wavelength mux/demux filter, and
   wherein the A band terminal of the A/B band wavelength mux/demux filter is connected to the A-band pass/B-band reflection filter; and the common band terminal of the A/B band wavelength mux/demux filter is connected to the first optical multiplexer/demultiplexer.

10. The light source distributor of claim 9, wherein the A-band pass/B-band reflection filter has a fused fiber WDM coupler.

11. The light source distributor of claim 9, wherein the A-band pass/B-band reflection filter has a three-terminal thin film filter configured to have a predetermined angle with respect to a path of the optical signal.

12. The light source distributor of claim 9, wherein the A-band pass/B-band reflection filter has a two-terminal thin film filter configured to have an angle substantially perpendicular to a path of the optical signal.

* * * * *